Jan. 6, 1925.

J. KOBASICH 1,522,065

TIRE RIM TOOL

Filed April 17, 1924

Inventor
J. Kobasich

By Clarence A. O'Brien
Attorney

Patented Jan. 6, 1925.

1,522,065

UNITED STATES PATENT OFFICE.

JOHN KOBASICH, OF HERMANSVILLE, MICHIGAN.

TIRE-RIM TOOL.

Application filed April 17, 1924. Serial No. 707,200.

*To all whom it may concern:*

Be it known that I, John Kobasich, a citizen of the United States, residing at Hermansville, in the county of Menominee and State of Michigan, have invented certain new and useful Improvements in a Tire-Rim Tool, of which the following is a specification.

This invention relates to tire rim tools and it consists in the novel features hereinafter described and claimed. An object of the invention is to provide a tool of the character stated which is of simple and durable structure and which may be easily and conveniently used for removing the rim from within the casing of a pneumatic tire structure.

With the above objects in view the tool comprises a bar made up of sections adapted to be disposed diametrically of the rim, the sections being provided at their outer ends with heads adapted to bear against the inner surface of the rim. The sections are externally screw threaded and gripper members are mounted upon the outer portions of the sections. The said gripper members are adapted to engage around the edges of the rim. A nut is threaded upon the inner portions of the bar sections and may be used for moving the said sections longitudinally with relation to each other whereby the bar may be extended or the sections may be moved toward each other as desired or required. Angularly disposed bars are pivotally mounted upon the sections of the first mentioned bar at points between the ends thereof and the angularly disposed bars are composed of sections connected together by a nut whereby the said angularly disposed bars may be extended or the sections thereof drawn together. The angularly disposed bars are provided at their outer ends with gripper members adapted to engage around the edges of the rim of the tire structure.

In the accompanying drawings:—

Figure 1:
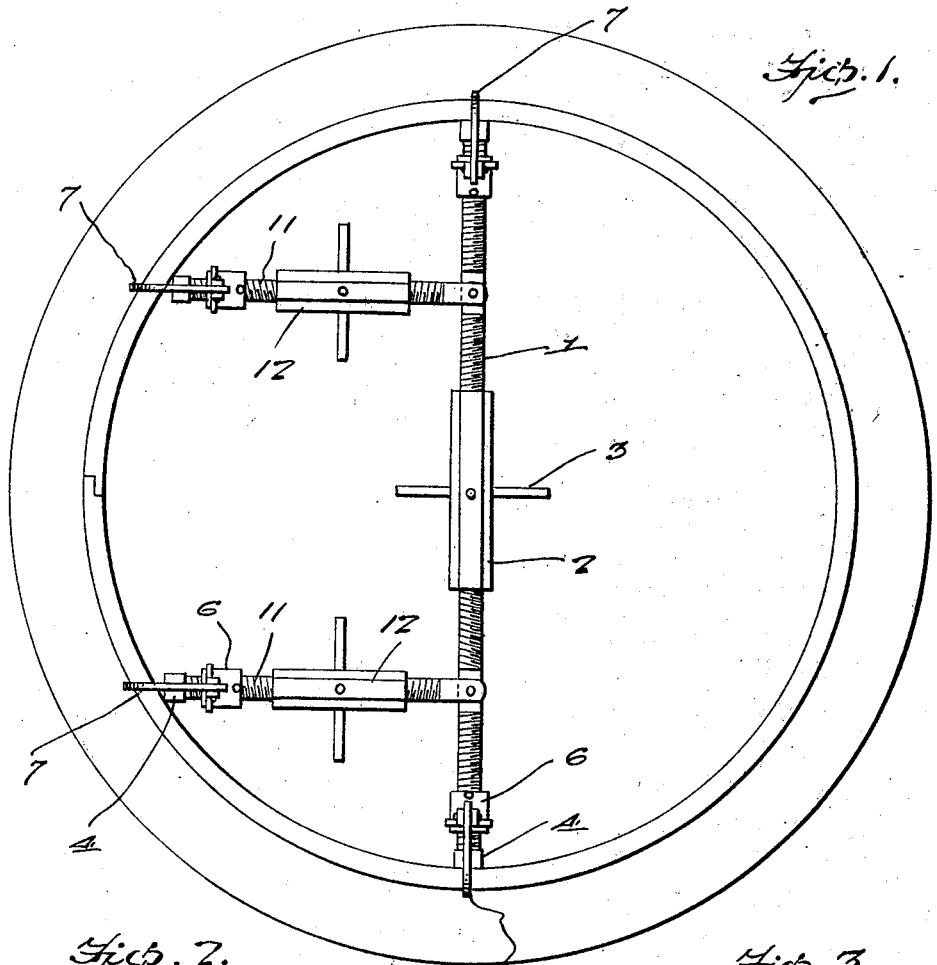
Figure 1 is a side elevation of a tire and rim with the tool applied to the rim.
Figures 2, 3:
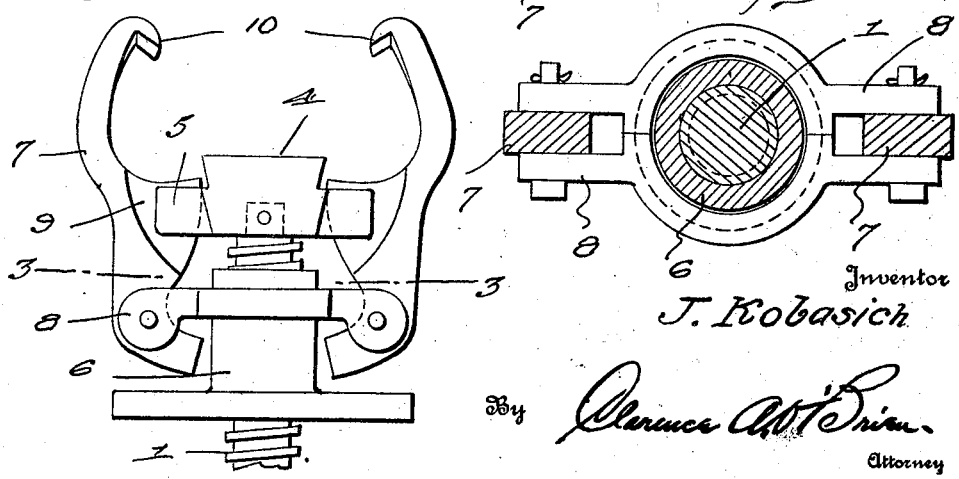
Figure 2 is an enlarged detailed side elevation of one of the sets of gripper members used at the outer sections of the bars.
Figure 3 is a transverse sectional view through the gripper members cut on the line 3—3 of Figure 2.

As illustrated in the accompanying drawing the tire rim tool comprises a bar 1 adapted to be disposed diametrically of the rim when the same is applied and the tool is in use. The bar 1 is composed of externally threaded sections which are connected together at their inner ends by a nut 2. A rod 3 may be passed transversely through the intermediate portions of the nut and may be used for turning the nut to spread the bar sections with relation to each other or to draw them together as required. The bar sections are provided at their outer ends with heads 4 adapted to bear against the inner surface of the rim when the device is in use. The head 4 is provided at its opposite sides with spaced guide lugs 5. Collars 6 are screw threaded upon the outer portions of the bar sections and engage the threads thereof whereby the said collars may be moved longitudinally of the bar sections when they are rotated thereon. Gripper members 7 are pivoted upon the plate 8 which is journaled upon the collar 6 and the said gripper members 7 are provided with flanges 9 which are slidably received between the guide members 5 upon the head 4. The gripper members 7 are provided with pointed ends 10 adapted to be engaged around the edges of the rim when the device is in use. The tool also includes angularly disposed bar members 11 which are pivotally connected with the sections of the bar 10 at points between the ends thereof. The bar members 11 are composed of sections which are externally threaded and connected together by means of nuts 12. The nuts 12 are similar to the nut 2 hereinbefore described and are adapted to be used for spreading the sections of the bar members 1 with relation to each other or for drawing them together as required. The bar members 11 carry at their outer ends gripper members similar to the gripper members 7 hereinbefore described and mounted in a similar manner and of which the arrangement shown in Figure 2 is an illustration. The gripper members which are carried at the outer ends of the bar members 11 are adapted to be engaged around the edges of the rim on the tire structure and in the vicinity of the ends thereof.

To remove the rim from the tire casing, the bar 1 is disposed diametrically within the rim and the gripper members at the outer ends of the bar sections 11 are engaged around the edges of the rim and in the vicinity of the ends thereof. The nuts 12 are then turned whereby the ends of the rim are moved toward the center of the tire casing, one end portion being moved inwardly in advance of the other. The nut 2 is then turned whereby the sections of the bar 1 are moved toward each other and thus the rim is contracted within the tire casing, is pulled away from the casing and may be lifted out of the casing.

Having thus described my invention, what I claim is:—

In a tire tool, an externally threaded rod section, a head member applied to the rod section and provided with spaced lugs, a collar threaded upon the head section and having an outstanding annular flange, a plate journaled upon the collar, gripper members pivoted to the plate and having flange portions which are slidably received between the lugs of the head, said gripper members having end portions disposed toward the flange upon the collar and provided at their opposite ends with bill extremities adapted to engage over the flanges of a wheel rim.

In testimony whereof I affix my signature.

JOHN KOBASICH.